United States Patent [19]

Nishimura et al.

[11] 4,309,073
[45] Jan. 5, 1982

[54] TRANSLUCENT SCREEN ASSEMBLY

[75] Inventors: Itsuro Nishimura, Takatsuki; Yoshimasa Takahashi, Nara, both of Japan

[73] Assignee: Sanyo Electric Co., Ltd., Osaka, Japan

[21] Appl. No.: 110,187

[22] Filed: Jan. 7, 1980

[30] Foreign Application Priority Data

Jan. 17, 1979 [JP] Japan ............................... 54-4043[U]

[51] Int. Cl.³ ............................................. G03B 21/60
[52] U.S. Cl. ..................................... 350/128; 350/167
[58] Field of Search ............... 350/128, 106, 167, 126; 428/327

[56] References Cited

U.S. PATENT DOCUMENTS 3,902,787  9/1975  Sherlock .................. 350/128 X

FOREIGN PATENT DOCUMENTS 469403  11/1950  Canada ..................... 350/128

Primary Examiner—Richard A. Wintercorn
Attorney, Agent, or Firm—Armstrong, Nikaido, Marmelstein & Kubovcik

[57] ABSTRACT

A screen assembly for use in projection type color television system includes a first layer of acrylic resin having a first surface formed with Fresnel lens and its second surface integrally formed with a second layer acrylic resin containing pigment for forming a diffuser.

5 Claims, 5 Drawing Figures

Fig. 1  Prior Art
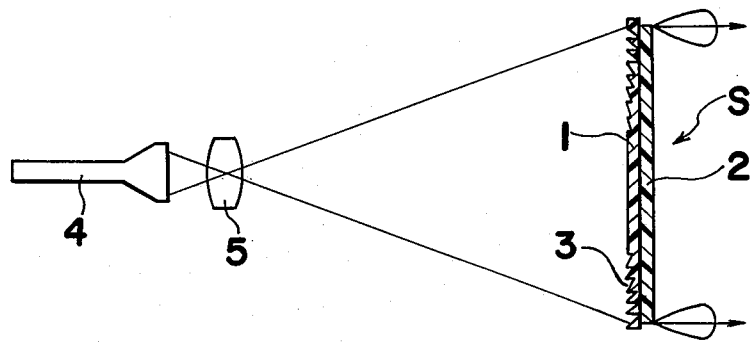
Fig. 2 Prior Art     Fig. 3 Prior Art     Fig. 4
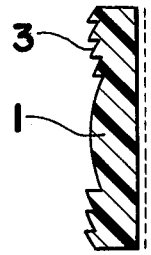 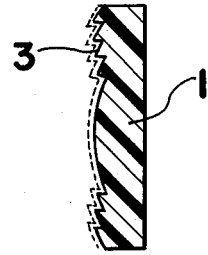 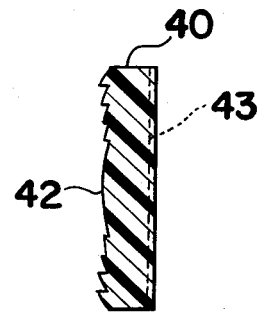
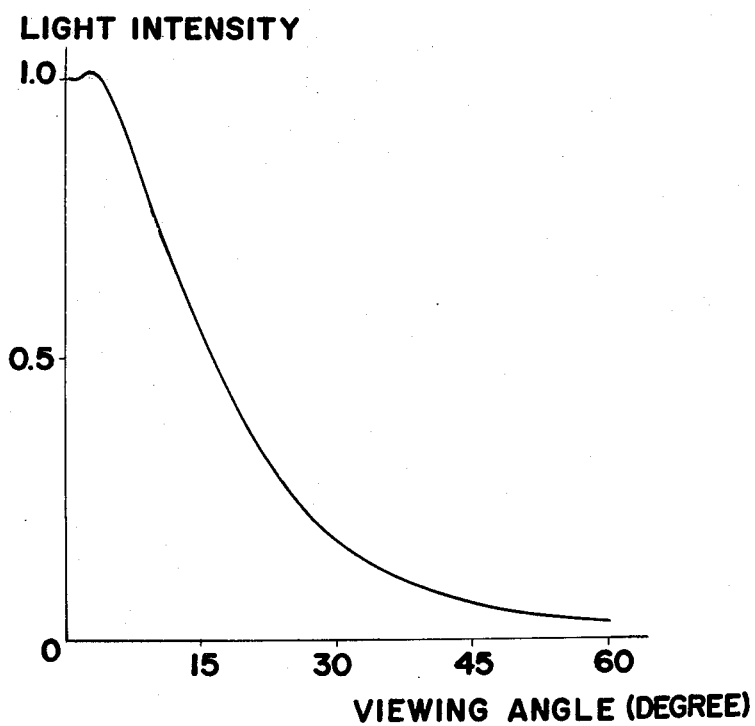
Fig. 5

TRANSLUCENT SCREEN ASSEMBLY

BACKGROUND OF THE INVENTION

The present invention relates to a screen assembly and, more particularly, to an improvement in translucent or transmissive screen assembly for use in a projection type color television system or as a display panels.

A conventional translucent screen assembly used in a projection type color television system is shown in FIG. 1.

Referring to FIG. 1, showing the principle of the optical system, the projection type color television system has three cathode ray tubes (only one cathode ray tube 4 is shown) for projection light beams of different primary colors which are normally red, green and blue, onto the translucent screen S through respective lens assembly 5. The three different color light beams are mixed with each other on the screen S to form a proper color picture. The picture so formed on the screen S is viewed by the observers who are occupying at the right-hand side of the screen, that is, at one side of the screen opposite to the side of the tubes.

In order to increase the brightness on the screen, generally the screen gain (amount of light projected on the screen) is increased by enlarging the effective aperture size of the lens assembly 5. However, due to various reasons such as difference in angle of incidence of the light beam from the cathode ray tube, the increased screen gain results in such a disadvantage that the picture at the center portion of the screen is brighter than that at the peripheral portion. This undesirable phenomenon is generally called a hot spot phenomenon. Therefore, even if the center portion should gain sufficient brightness, the brightness at the peripheral portion will still be under the required brightness. Therefore, when the observer scans over the screen, he still has such a feeling that the brightness is not sufficient.

From the view point of practical manner, it has been found that the observer feels brighter if the picture on the screen has a uniform brightness rather than one particular portion brighter than the other.

In view of this, there have been proposed various types of screen assemblies which uniform the brightness of the picture on the screen. One conventional screen assembly is shown in FIG. 1 and includes a layer of Fresnel plate member 1 and a layer of diffuser plate member 2 which are placed and bonded one over the other. In use, the screen assembly is positioned with the Fresnel plate member 1 facing the cathode ray tube and with the differ plate member 2 facing the observer. The Fresnel plate member 1 has a plurality of grooves formed on the surface facing the cathode ray tube for forming a Fresnel lens 3 thereon.

However, in the above arrangement of the screen S, the reflection effected on the opposite faces of each of the plate members 1 and 2 particularly on the bonded face causes a loss of light beam from the cathode ray tubes and thus results in reduction of the contrast.

Furthermore, since the plate members 1 and 2 are manufactured separately and are then bonded to each other, the manufacturing cost of the screen assembly has been considerably high.

For simplifying the manufacturing steps, one may contemplate that the screen assembly can be formed by the Fresnel plate member 1 only, with its plain surface opposing the Fresnel lens surface being mat finished, such as shown in FIG. 2, or otherwise, the mat finishing can be effected on the Fresnal lens surface as shown in FIG. 3. However, in the former assembly, the ambient light will be diffused on the mat finished surface thereby reducing the contrast of the picture on the screen and may easily cause a damage to the mat finish since it is disposed on the observer side. Whereas in the latter assembly, it is practically difficult to provide a mat finished layer uniformly over the grooved surface particularly when the grooves has a very small pitch such as 0.5 mm to 1.0 mm.

SUMMARY OF THE INVENTION

Accordingly, it is a primary object of the present invention to provide an improved screen assembly which is simple in construction and can readily be manufactured at low cost.

It is another object of the present invention to provide a screen assembly of the above described type which minimizes the reduction in contrast caused by the ambient light.

It is a further object of the present invention to provide a screen assembly of the above described type which minimizes the loss of light beam from the cathode ray tube in the screen.

It is yet another object of the present invention to provide a screen assembly of the above described type which can be simply repaired when the screen is damaged by the scratch or the like.

In accordance with a preferable embodiment of the invention, a screen assembly comprises a first layer of translucent resin having a first surface formed with a Fresnel lens and a second surface, and a second layer of translucent resin mixed with diffusion element such as pigment. The second layer is integrally provided on the second surface of the first layer.

BRIEF DESCRIPTION OF THE DRAWINGS

The foregoing and other objects, features and advantages of the invention will be apparent from the following description of the invention with reference to the accompanying drawings in which:

FIGS. 1, 2 and 3 have already been referred to in the foregoing description, FIG. 1 being a schematic diagram showing a principle of the projection type television system, FIGS. 2 and 3 are cross-sectional views of improved screen assemblies which are not practically applicable;

FIG. 4 is a cross sectional view of a screen assembly according to the present invention; and FIG. 5 is a graph showing a diffusion characteristics.

DETAILED DESCRIPTION OF THE INVENTION

Referring to FIG. 4, a screen assembly of the present invention comprises a plate 40 made of acrylic resin with its one surface formed with Fresnel lens 42 while the other surface is finished through polishing. The plate 40 contains a thin layer of isotropic diffuser 43 formed by pigment mainly consisting of $SiO_2$. According to a preferably embodiment, the diffuser 43 is positioned closely adjacent to the polished surface. When the screen assembly of the present invention is to be used, the Fresnel lens surface faces the cathode ray tubes while the polished surface faces the observers.

The steps for manufacturing the screen assembly of the present invention are described below.

A molten pure acrylic resin is injected into a mold or a thin container constituted by a pair of glass plates disposed in face-to-face relation, preferably in parallel relation, to each other, and side walls around the edges of the glass plates except a portion from which the molten acrylic resin is injected. At least one of the glass plates is arranged movable in a direction perpendicular to the glass plate so that the distance between the glass plates can be changed. When the acrylic resin filled in the container solidifies, the movable glass plate is shifted to widen the distance between the glass plates for forming a gap between the solidified acrylic resin and the movable glass plate.

Then, a molten acrylic resin mixed with pigment is injected into the gap between the solidified resin and the glass plate for forming the diffuser 43. In this step, a care must be taken for preventing the mixture of resin and pigment from being mingled with the previously injected pure acrylic resin.

In the above steps, the pure molten acrylic resin before being injected into the thin container should preferably be in the state of syrup in which the resin is already polymerized to some extent. Similarly, the molten resin mixed with pigment should also preferably be in the state of syrup before being injected.

For reinforcing the screen assembly, the movable glass plate is further shifted for the injection of further pure acrylic resin.

When the injected resin solidifies, the glass plates are removed for ejecting the molded piece from the container. Then, one surface of the molded piece, preferably the surface which has been in contact with the fixed glass plate is pressed against a grooved block for forming a Fresnel lens thereon, thus completing the screen assembly.

Instead of pressing the grooved block, the Fresnel lens can be formed by employing the grooved block in place of the fixed glass plate.

According to a preferable arrangement, the screen assembly has a thickness of 3 mm in total and within which the layer of diffuser 43 occupies the thickness of 0.5 mm. Since the screen assembly of the present invention is formed through injection molding, a considerably thin diffuser layer in the form of film can be formed uniformly. Therefore, the image on the screen assembly of the present invention has an improved contrast and a uniform brightness.

A diffusion characteristics of the screen assembly according to the present invention is shown in FIG. 5 in which the axes of abscissas and ordinates represent viewing angle and light intensity, respectively.

Since the screen assembly of the present invention has a polished surface on the observer side, the ambient light beam projected on the screen at the angle of incidence larger than the critical angle will not be reflected on the screen. Therefore, the contrast of the picture on the screen will not be decreased. Furthermore, since there is no bonded surface in the screen assembly of the present invention, any light beam from the cathode ray tubes is hardly reduced. Moreover, in the case where the screen is damaged, for example, by a scratch, it can be simply repaired by filling in the acrylic resin in the scratch.

Since the screen assembly of the present invention can be manufactured in simple steps, the manufacturing cost therefor is considerably reduced.

Although the present invention has been fully described by way of examples with reference to the accompanying drawings, it is to be noted that various changes and modifications are apparent to those skilled in the art. Therefore, such changes and modifications are, unless they depart from the true scope of the present invention, to be understood as included therein.

What is claimed is:

1. A screen assembly comprising:
   (a) a first layer consisting essentially of a translucent resin, having a first surface formed with a Fresnel lens and a second surface on the opposite side of said first layer from said first surface thereof;
   (b) a second layer comprising a resin mixed with a diffusion means, said second layer having a first surface which is integrally formed on the second surface of said first layer, wherein said first layer is thicker than said second layer;
   (c) a third layer consisting essentially of a translucent resin, said third layer having a first surface which is integrally formed on a second surface of said second layer, said second surface of said second layer being on the opposite side of said second layer from said first surface thereof, and said third layer having a second surface on the opposite side of said third layer from said first surface thereof, said second surface of said third layer being polished.

2. A screen assembly as claimed in claim 1, wherein the ratio of the thickness of said first layer to the thickness of said second layer is 6 to 1.

3. A screen assembly as claimed in claim 1, wherein said diffusion means is a pigment.

4. A screen assembly as claimed in claim 3, wherein said pigment is consists essentially of $SiO_2$.

5. A screen assembly as claimed in any one of claims 1, 2, 3 or 4, wherein said translucent resin is an acrylic resin.

* * * * *